April 27, 1954
P. PAPPAS
2,676,585
COFFEE-MAKING APPARATUS
Filed Feb. 4, 1950
3 Sheets-Sheet 1
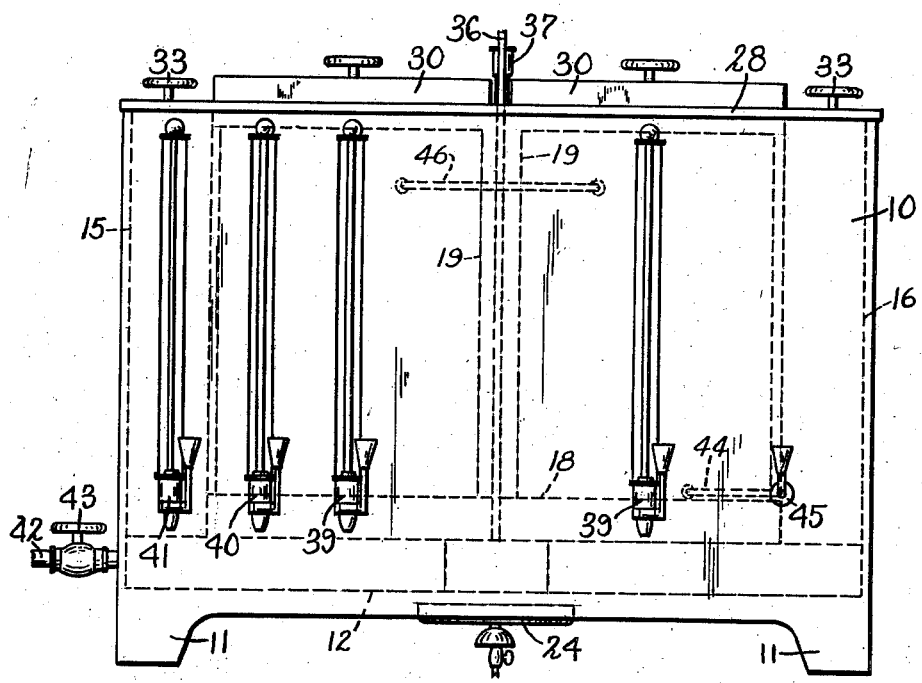
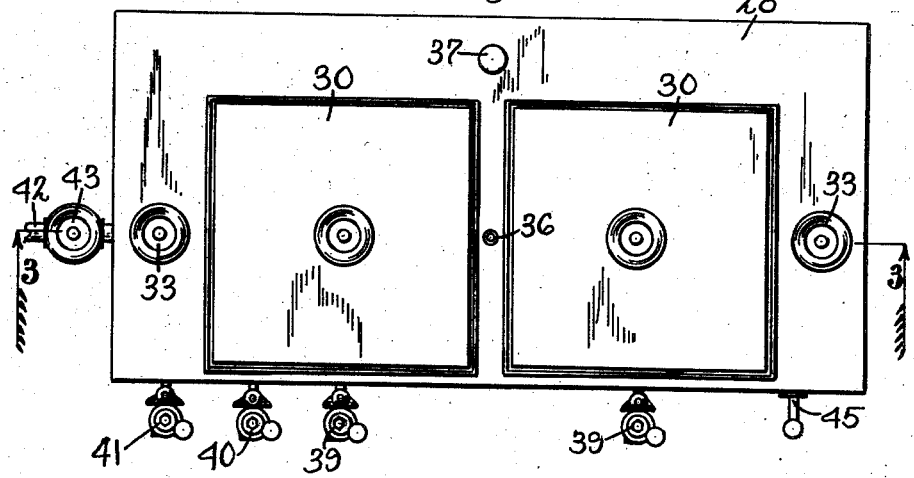
Inventor
Peter Pappas
By
Rockwell & Saraketon
Attorneys April 27, 1954 P. PAPPAS 2,676,585
COFFEE-MAKING APPARATUS
Filed Feb. 4, 1950 3 Sheets-Sheet 2

Inventor
Peter Pappas
By
Rockwell Bartholow
Attorneys

April 27, 1954 P. PAPPAS 2,676,585
COFFEE-MAKING APPARATUS
Filed Feb. 4, 1950 3 Sheets-Sheet 3
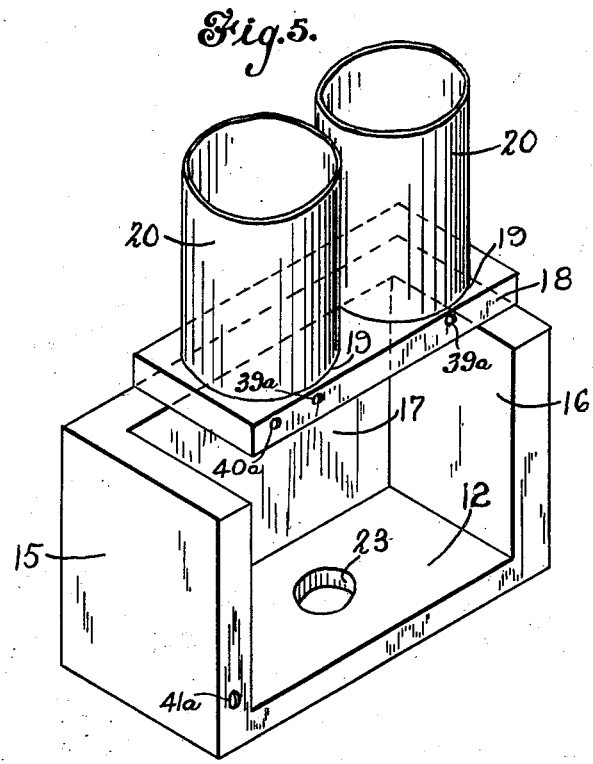
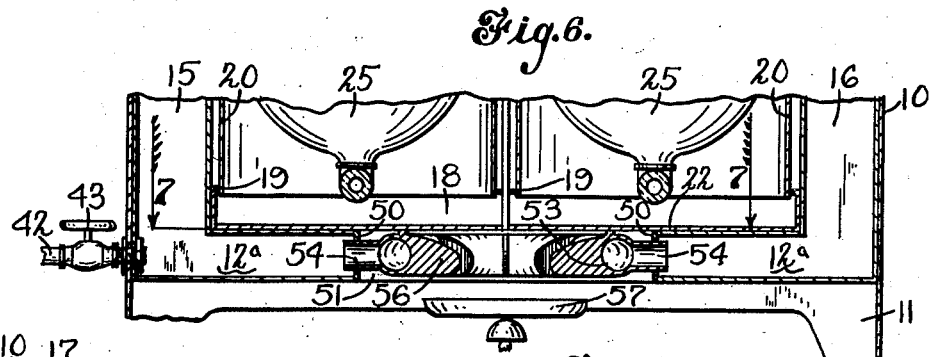
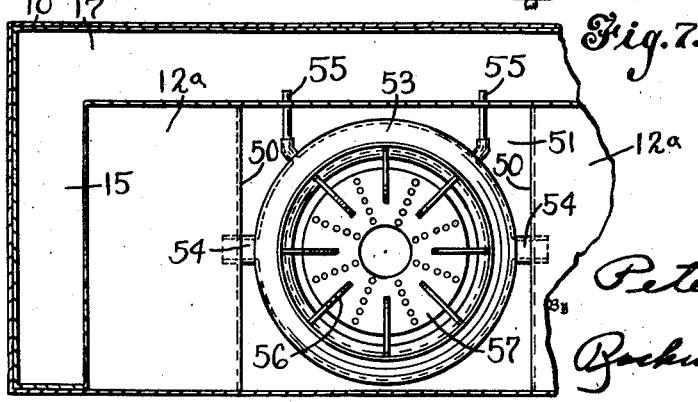
Inventor
Peter Pappas Patented Apr. 27, 1954

2,676,585

UNITED STATES PATENT OFFICE 2,676,585

COFFEE-MAKING APPARATUS

Peter Pappas, New Haven, Conn.

Application February 4, 1950, Serial No. 142,393

2 Claims. (Cl. 126—378)

This invention relates to coffee-making apparatus and more particularly to an apparatus of this character for use in restaurants or other places where large quantities of coffee are to be made. Such apparatus normally include means for heating the water from which the coffee is made, which is usually termed the boiler, and also means for keeping the prepared coffee hot after it has been made and before it is served.

The device of the present invention is constructed particularly to be operated economically with the use of a relatively small quantity of fuel. To this end the coffee urns which hold the prepared coffee are placed adjacent the central portion of the apparatus, as distinguished from prior devices of this kind in which the boiler is usually centrally located and the coffee urns placed on each side of the boiler.

In the present construction the boiler is of unique formation as it includes a horizontal chamber extending substantially the length of the apparatus and vertically-disposed chambers at the ends and the rear side of the horizontal chamber. These vertical chambers are connected to each other to form a U-shaped structure in horizontal section and the two end chambers communicate with the rear chamber, and all communicate with the horizontal chamber so as to form a hollow water jacket having a base and three upstanding sides, but open at the front and the top.

The coffee urns are also mounted upon a horizontal water chamber which is disposed within the boiler jacket described above so that the urns are enclosed upon three sides by the water jacket of the boiler as well as resting upon it and, thus, absorb heat from the water jacket.

The horizontal water chamber of the boiler is provided with a central opening which extends therethrough so that the horizontal base of the jacket of the urns is exposed therethrough and when a burner, such as a gas burner for example, is placed under this opening, the frame will impinge upon the water jacket of the urn so as to heat the water therein as well as impinge upon the adjacent portions of the boiler to heat the water in the latter.

One object of the present invention is to provide a coffee-making apparatus of improved construction and which will be efficient in operation.

A further object of the invention is to provide a coffee-making apparatus in which the coffee urns will be embraced within a water jacket which constitutes the boiler, so as to absorb heat from the latter.

Still another object of the invention is to provide a coffee-making apparatus consisting of a boiler or water heater and coffee urns, the boiler being made in the form of a water jacket having a horizontal chamber and upstanding rear and end chambers communicating with the horizontal chamber, and the urns of which are mounted between the end walls of this water jacket so as to be surrounded on three sides by the jacket.

A still further object of the invention is to provide an improved means for heating the water in the boiler and urns.

To these and other ends the invention consists in the novel features and combinations of parts to be hereinafter described and claimed.

In the accompanying drawings:

Fig. 1 is a front elevational view of a coffee-making apparatus embodying my invention;

Fig. 2 is a top plan view of the same;

Fig. 5 is a perspective exploded view of the boiler and urn structure;

Fig. 6 is a partial sectional view of the lower portion of a coffee-making apparatus showing a modified form of my invention; and Fig. 7 is a sectional view on line 7—7 of Fig. 6.

Figure 3:
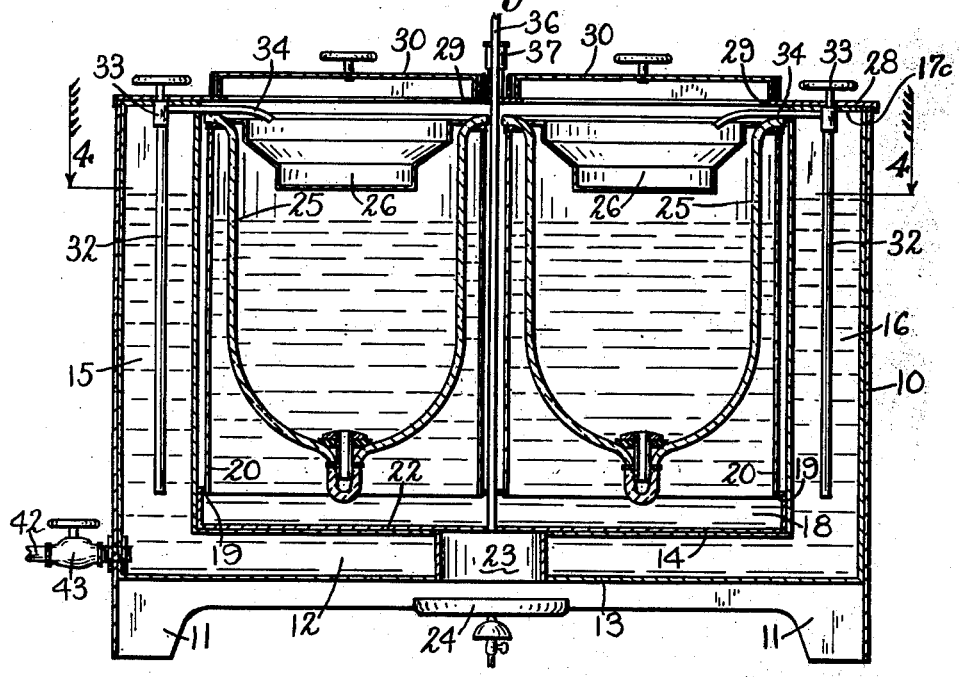
Fig. 3 is a sectional view on line 3—3 of Fig. 2.

To illustrate a preferred embodiment of my invention, I have shown in the drawings an outer casing or frame 10 designed to be supported from a table or the like by legs 11. Within the frame is secured a boiler or water heater of novel form, shown more especially in Figs. 3, 4, and 5. This boiler comprises a horizontal chamber 12 having spaced bottom and top members 13 and 14 to provide a horizontal water jacket therebetween. Vertically disposed chambers or jackets 15, 16 and 17 extend upwardly from the horizontal water jacket 12 and communicate therewith at their lower ends. The jacket 15 has inner and outer walls 15a and 15b while the jacket 16 has inner and outer walls 16a and 16b, and the rear jacket 17 inner and outer walls 17a and 17b respectively. The jacket 15 is provided with a front wall 15c, the jacket 16 provided with a front wall 16c, and a top wall 17c covers all of these jackets.

Figure 4:
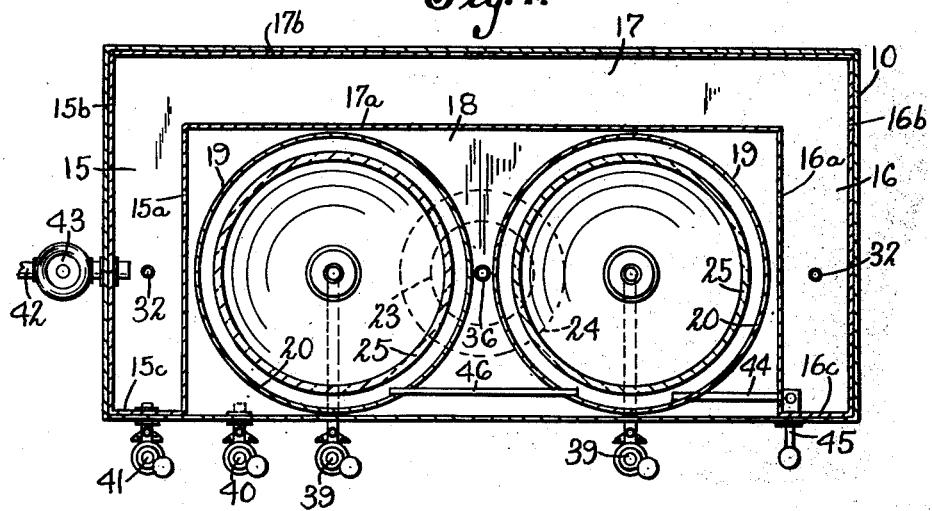
Fig. 4 is a sectional view on line 4—4 of Fig. 3.

As shown in Fig. 5, these upstanding jackets constitute the end and rear walls of a hollow rectangular frame and each of these members consists of spaced walls so as to provide a vertical water jacket communicating with the horizontal water jacket 12 at its lower end, as shown for example in Fig. 4. Moreover, as is shown in this figure, the rear jacket 17 communicates at its ends with the end jackets 15 and 16 so as to form a U-shaped structure which may be filled with water.

Mounted within the hollow water jacket above described, and between the end members 15 and 16 thereof, is an urn structure shown more especially in Figs. 3 and 5. This structure comprises a horizontal chamber or water table 18 having openings 19 in its upper surface in which are placed urns 20 so that the lower ends of the urns communicate with the hollow table 18, as shown in Fig. 3.

The bottom 22 of the hollow table is seated on the cover 14 of the horizontal water chamber 12 of the boiler and the latter is provided with a central opening or flue 23 which extends through the chamber 12 and exposes the bottom 22 of the water table 18 to the flame of the burner 24, so that the flame will impinge upon the bottom of the hollow water table 18 of the urns and heat the water therein, as well as heat the water in the chamber 12. It is, of course, understood that the flue 23 makes a water tight connection with the bottom and top walls 13 and 14 of the chamber 12.

Within the urns 20 are seated the coffee pots 25 within which are supported the usual coffee baskets 26. The top portion 28 of the casing 10 is provided with openings 29 which are closed by removable covers 30. In each of the vertically-disposed chambers 15 and 16 is a water pipe 32 connected by the valve structure 33 to a supply spout 34 extending over the adjacent coffee basket 26 so that water may be admitted when desired from the boiler to the coffee pots 25.

A discharge pipe 36 extends upwardly from the opening or flue 23 to permit escape of the burnt gases and a relief valve 37 (Figs. 2 and 3) is provided at the upper portion of the rear water jacket 17 of the boiler.

Coffee may be drawn from the pots 25 through the faucets 39 (Fig. 4) and similarly water may be drawn from the hollow table 18 which communicates with the urns 20 from the faucet 40 and may be drawn from the boiler by the faucet 41. Water may be admitted to the boiler through the supply line 42 controlled by the valve 43. Openings 39ª and 40ª are shown (Fig. 5) in the water table 18 for passage of the faucets 39 and 40, and an opening 41ª is provided in the boiler for the faucet 41.

Water is admitted to the urns 20 by the pipe 44 connecting one of the urns with the portion 16 of the water jacket, this communication being controlled by the valve 45 and the two urns are in communication with each other through a pipe 46 which connects them adjacent the upper portion thereof at a point above the normal water level therein. Placing the air spaces in the upper portions of the urns in communication in this manner prevents vibration of the device in use due to resurgence of the water in the urns.

It will be apparent that with the above construction the urns and the hollow table 18 with which they are in communication rest upon the horizontal water jacket 12 of the boiler and are surrounded on three sides by the jackets 15, 16 and 17 of the boiler, which makes for very efficient operation of the device. Placing the urns within a boiler jacket of this shape effects a compact arrangement of the parts and at the same time affords a boiler of sufficient capacity for the two urns. It will be apparent that the arrangement is much more compact than is the case where each of the urns and the boiler are arranged as separate stacks upon a supporting base.

In Figs. 6 and 7 of the drawing, I have shown a slight modification of my invention. In this form of my device the lower horizontal chamber 12 of the boiler is provided with a central opening considerably larger than the opening or flue 23 described in connection with the form of my invention shown in Figs. 1 to 5. As disclosed in the drawings, the horizontal chamber of the boiler in Figs. 6 and 7 is divided into two parts 12ª so that the inner walls 50 of these chambers extend to the rear chamber or jacket 17, as shown in Fig. 7. This provides a relatively large opening 51 through which the bottom 22 of the water chamber 18 is exposed.

In the opening 51 a hollow heating coil 53 is disposed, this coil being connected with the chambers 12ª by pipes 54 and connected with the chamber 17 by pipes 55. The coil is of generally circular shape and is provided with inwardly projecting flat fins 56 to collect the heat from the flame issuing from the burner 57 and convey it to the circular coil 53 to heat the water therein. As illustrated, the coil is of cast metal and is generally in the form of a hollow annulus with the fins 56 projecting radially inward toward the center of the annulus so as to lie over the burner 57. The provision of a coil of this type insures the heating of the water in the boiler as, due to the fact that the urns are embraced by the boiler, the water in the latter requires a relatively small amount of heat.

While I have shown and described some preferred embodiments of my invention, it will be understood that it is not to be limited to all of the details shown, but is capable of modification and variation within the spirit of the invention and within the scope of the claims.

What I claim is:

1. In a coffee-making apparatus, a boiler comprising a horizontal chamber and an upstanding water jacket communicating therewith, said jacket being of substantially U-shaped form in horizontal cross section, a water table resting on said chamber within the U-shaped walls of the water jacket to be embraced thereby, a coffee urn above said table and embraced by the U-shaped walls of the jacket, the bottom of said urn opening into the water table, said chamber having an opening therethrough from top to bottom through which the lower surface of the water table is exposed, and heating means positioned directly below said opening for heating the water in the boiler and applying heat to the urn through said opening.

2. In a coffee-making apparatus, a boiler comprising a horizontal chamber and an upstanding water jacket communicating therewith, said jacket being of substantially U-shaped form in horizontal cross section, a water table resting on said chamber within the U-shaped walls of the water jacket to be embraced thereby, a coffee urn above said table and embraced by the U-shaped walls of the jacket, the bottom of said urn opening into the water table, said chamber having an opening therethrough from top to bottom through which the lower surface of the water table is exposed, heating means positioned directly below said opening for heating the water in the boiler and applying heat to the urn through said opening, and a hollow heating coil mounted in said opening, said coil being in communication with the interior of the chamber.

References Cited in the file of this patent

UNITED STATES PATENTS

| Number | Name | Date |
|---|---|---|
| 224,625 | Ashcroft | Feb. 17, 1880 |
| 368,340 | Kaplan | Aug. 16, 1887 |
| 607,776 | Swaim | July 19, 1898 |
| 715,945 | Beach | Dec. 16, 1902 |
| 798,010 | Carmichael | Aug. 22, 1905 |
| 1,124,646 | Pahl | Jan. 12, 1915 |
| 1,167,199 | Mintz | Jan. 4, 1916 |
| 1,247,936 | Cowart | Nov. 27, 1917 |
| 1,357,100 | Lear | Oct. 26, 1920 |
| 1,457,372 | Kennedy | June 5, 1923 |
| 1,461,092 | Ivancic | July 10, 1923 |
| 1,471,933 | Wertheimer | Oct. 23, 1923 |
| 1,734,667 | Fiore | Nov. 5, 1929 |
| 2,299,809 | Ershler | Oct. 27, 1942 |
| 2,317,214 | Pappas | Apr. 20, 1943 |